United States Patent
Edwards et al.

(10) Patent No.: US 6,260,229 B1
(45) Date of Patent: Jul. 17, 2001

(54) BRISTLE SUB-ASSEMBLIES AND METHOD OF MAKING SAME

(75) Inventors: Mark Stephen Edwards, Hockessin; Wayne Hugh Marshall, Wilmington; Roberto Bucker, Hockessin, all of DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/247,093

(22) Filed: Feb. 9, 1999

Related U.S. Application Data (63) Continuation-in-part of application No. 09/092,092, filed on Jun. 5, 1998, now Pat. No. 6,096,151.

(51) Int. Cl.[7] .............................. A46B 9/04; A46D 1/04
(52) U.S. Cl. .................... 15/207.2; 15/167.1; 15/DIG. 5
(58) Field of Search ............... 15/159.1, 167.1, 15/207.2, 229.1, DIG. 5, DIG. 6; 300/21

(56) References Cited

U.S. PATENT DOCUMENTS

| | | | |
|---|---|---|---|
| 1,625,857 | * 4/1927 | Jumonville | 300/21 |
| 2,599,191 | 6/1952 | Meunier | 15/167.1 |
| 3,520,017 | * 7/1970 | Moss | 15/159.1 |
| 3,568,234 | * 3/1971 | Komatsu | 15/229.1 |
| 4,030,845 | 6/1977 | Deckert | 401/268 |
| 4,133,147 | * 1/1979 | Swift, Jr. | 300/21 |
| 4,211,217 | 7/1980 | Gueret | 601/137 |
| 4,325,900 | * 4/1982 | Holding et al. | 300/21 |
| 4,325,902 | * 4/1982 | Holding | 300/21 |
| 4,382,309 | 5/1983 | Collis . | |
| 4,406,032 | 9/1983 | Diamant | 15/167.1 |
| 4,438,541 | 3/1984 | Jacob et al. | 15/167.1 |
| 4,493,125 | 1/1985 | Collis | 15/167.2 |
| 4,616,374 | 10/1986 | Novogrodsky . | |
| 4,625,738 | 12/1986 | Skovdal et al. . | |
| 5,638,569 | * 6/1997 | Newell | 15/229.1 |
| 5,967,617 | * 10/1999 | Zapanta | 300/21 |
| 6,023,809 | * 2/2000 | Demetriades | 15/229.1 |

FOREIGN PATENT DOCUMENTS

| | | |
|---|---|---|
| 3624343 | 5/1988 | (DE) . |
| 0635222 | 1/1995 | (EP) . |
| 99/42019 | 8/1999 | (WO) . |
| WO 99/62371 | 12/1999 | (WO) . |

OTHER PUBLICATIONS

PCT International Search Report dated May 30, 2000.

* cited by examiner

Primary Examiner—Randall E. Chin (57) ABSTRACT

A bristle sub-assembly includes first and second base strings and a plurality of polymeric monofilaments connected to and extending between the first and second base strings. The polymeric monofilaments form a first arched row when the first and second base strings are brought together. Several types and configurations of brushes are made using either arched bristles or combinations of arched and straight bristles.

60 Claims, 8 Drawing Sheets

BRISTLE SUB-ASSEMBLIES AND METHOD OF MAKING SAME

RELATED APPLICATIONS

This is a continuation-in-part of U.S. Ser. No. 09/092,092, filed Jun. 5, 1998, now U.S. Pat. No. 6,096,151.

BACKGROUND OF THE INVENTION

The present invention relates generally to articles made of polymeric monofilaments, and more particularly, to looped bristles, methods for making looped bristles and bristle sub-assemblies, and monofilament bristle sub-assemblies connected to brush bodies.

The aforementioned co-pending application describes a manufacturing technique in which a base string is fed axially along a mandrel while at the same time a monofilament is wrapped around the mandrel, thereby producing a plurality of "wraps" which are transported along the mandrel by the base string. The wraps are then bonded to the base string using an ultrasonic welder, and subsequently cut to thereby form an article having two rows of monofilament segments connected to the base string.

This article, called a "bristle string," can then be cut to lengths and used to make a variety of brushes or other products requiring bristles. In one example, several rows of bristles are formed in a toothbrush by mounting the bristle string segments in the head portion of a toothbrush. Typically, the proximal ends of the bristles are connected to the brush head and the distal ends extend freely upwardly.

Brushes with looped bristles have been used in the past. For example, U.S. Pat. No. 4,211,217 to Gueret describes a hair and massage brush in which the bristles are bent to form loops which are anchored in perforations formed in the brush head fusing the ends together. As another example, U.S. Pat. No. 4,406,032 to Diamant describes a toothbrush which includes a filament wrapped around the head to form a plurality of circular loops.

U.S. Pat. No. 4,493,125 to Collis describes a toothbrush having a combination of curved bristles and straight bristles. The curved bristles were formed by having opposite ends of straight filaments embedded in the head of the toothbrush in groups, thereby forming loops. The loops are then cut axially to form two rows of curved bristles. Other examples where looped bristles are used in a toothbrush are shown in U.S. Pat. Nos. 4,030,845 to Deckert, 2,599,191 to Meunier, and 4,438,541 to Jacob et al.

While these show various forms of loop bristles, a need exists for a looped bristle structure that is relatively easy to manufacture and cost effective to produce.

SUMMARY OF THE INVENTION

An object of the present invention is to provide means to expand brush design beyond the range possible with current tufting techniques.

Another object of the present invention is to provide a bristle sub-assembly for a brush in which individual filaments are positionally fixed with respect to each other prior to connection to a brush body.

Still another object of the present invention is to provide a method of assembling brushes in which bristle sub-assemblies can be permanently connected to the brush body or, alternatively, detachably connected for subsequent replacement, thereby avoiding wastefully discarding otherwise functional brush bodies.

Yet another object of the invention is to provide a brush that has a combination of arched bristles, looped bristles and straight bristles, whereby both types of bristles can be assembled without using conventional tufting techniques.

These and other objects are met by providing a bristle sub-assembly which includes two substantially parallel base strings and a plurality of polymeric monofilaments connected transversely between the two base strings. When the two base strings are juxtaposed to each other, they form a single row of arched monofilaments. The row of arched monofilaments can be sized to a desired length by cutting the two base strings and then connecting them to a brush head in desired patterns.

Other objects and features of the invention will become more apparent from the following detailed description when taken in conjunction with the illustrative embodiments in the accompanying drawings.

DETAILED DESCRIPTION OF THE PREFERRED EMBODIMENTS

Figure 1:
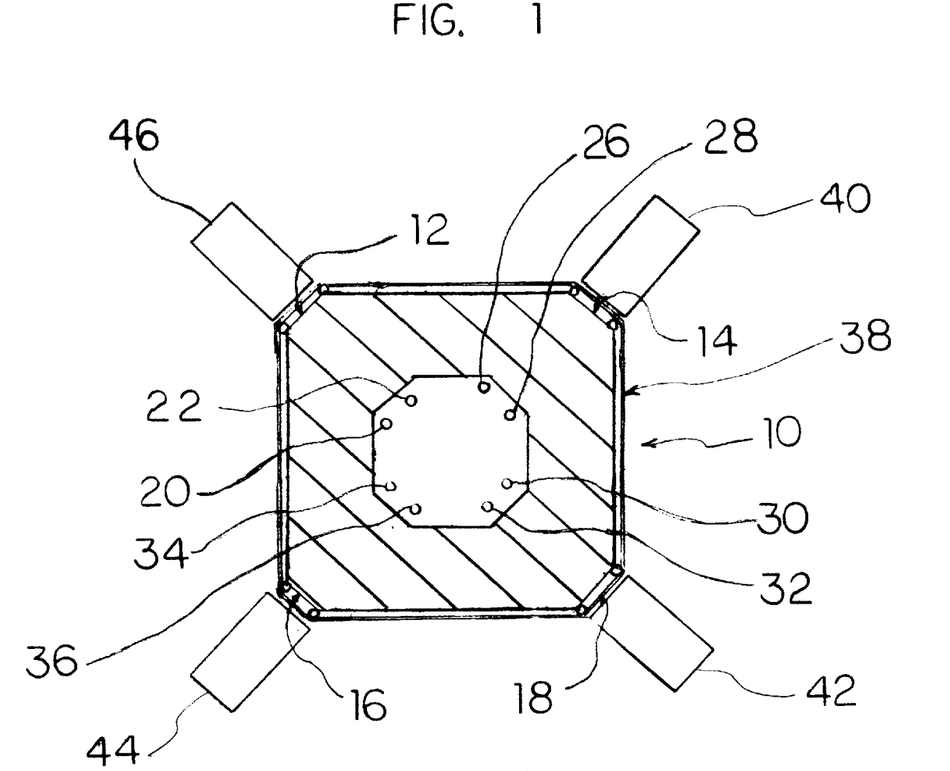
FIG. 1 is a horizontal sectional view of an apparatus for making bristle sub-assemblies according to a preferred embodiment of the present invention, taken at an ultrasonic welding stage.
Figure 2:
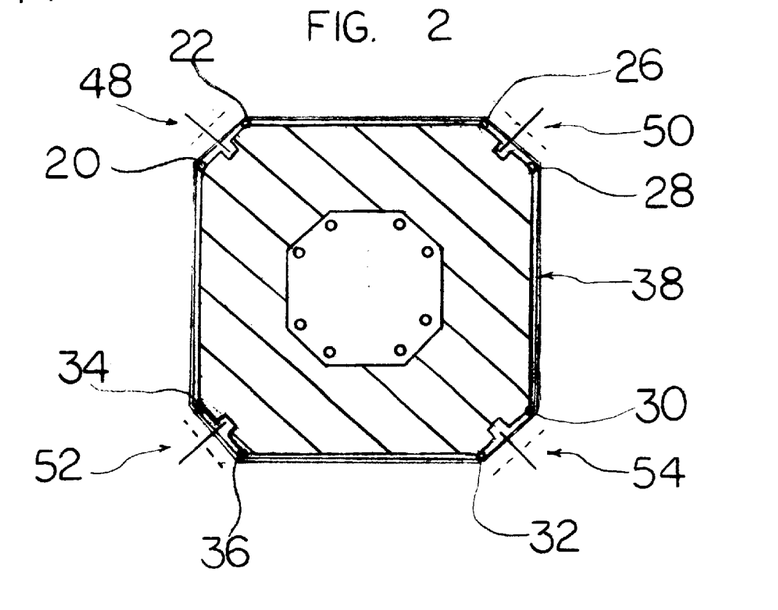
FIG. 2 is a horizontal sectional view of an apparatus for making bristle sub-assemblies according to a preferred embodiment of the present invention, taken at a cutting stage.

Referring to FIGS. 1 and 2, a hollow, substantially rectangular mandrel 10 has four beveled corners 12, 14, 16, and 18 which include flat surfaces that are at 45° angles to the contiguous flat surfaces of the mandrel 10. Base strings 20, 22, 26, 28, 30, 32, 34 and 36, entering one axial end of the mandrel 10, pass downwardly through the interior of the mandrel 10. The base strings are turned at the opposite end and guided for movement in the opposite direction in pairs along respective corners of the mandrel 10 as shown.

A monofilament 38 is wrapped around the mandrel 10 as the base strings translate to thereby form a plurality of wraps that are in contact with the base strings. The base strings move the wraps under ultrasonic bonding horns 40, 42, 44 and 46, each of which is juxtaposed a respective corner of the mandrel 10. The horns are energized to thermally fuse the wraps of monofilament to the base strings.

After bonding, the base strings further transport the monofilament wraps, now connected to the base strings, to a cutting station. As seen in FIG. 2, the cutting station includes a cutting blade 48, 50, 52, and 54 disposed at respective corners to cut the monofilament wraps between each pair of base strings to form four separate bristle sub-assemblies. While each cutting blade is shown to be rotatable about an axis illustrated in broken lines in FIG. 2, any suitable mechanical or wave energy cutting device can be employed.

Figure 3:
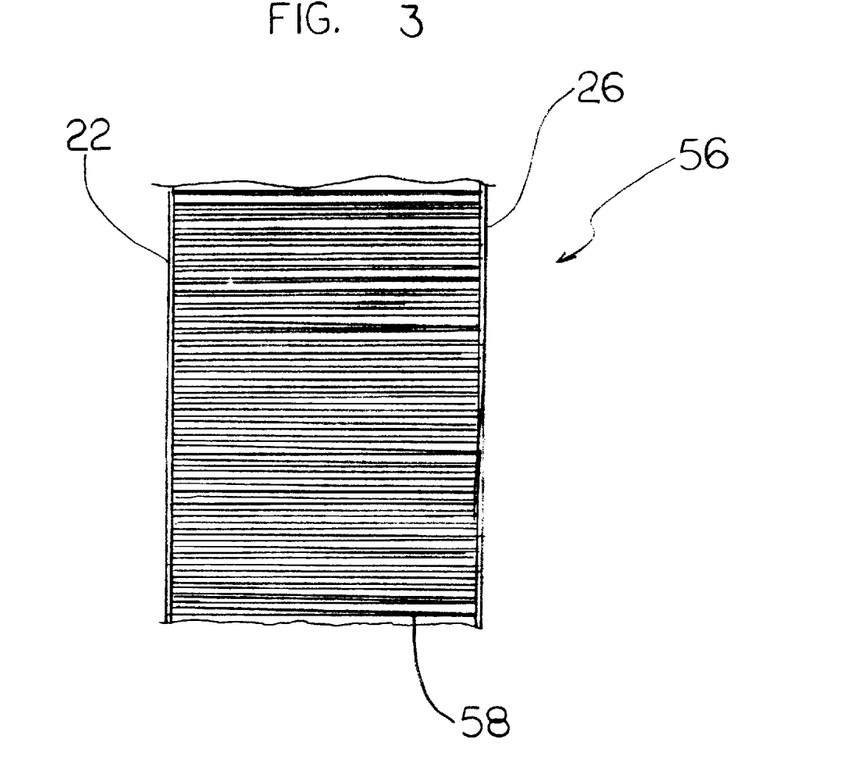
FIG. 3 is a plan view of a bristle sub-assembly made with the apparatus of FIG. 1, prior to bending the monofilament segments into arched formations.
Figure 4:
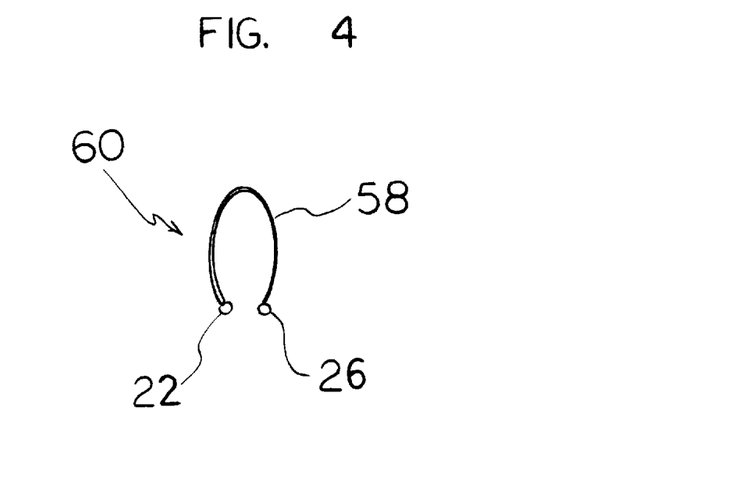
FIG. 4 is an end view of a row of arched monofilaments made from the bristle sub-assembly of FIG. 3.

Referring to FIG. 3, one of the bristle sub-assemblies 56 is shown with two base strings 22 and 26, disposed parallel to each other, and the plurality of wraps bonded to the base strings at substantially right angles to form a plurality of monofilament segments 58. As seen in FIG. 4, as the parallel base strings 22 and 26 are moved towards each other, the monofilament segments 58 bend to form an arched row 60 of monofilaments.

Figure 5:
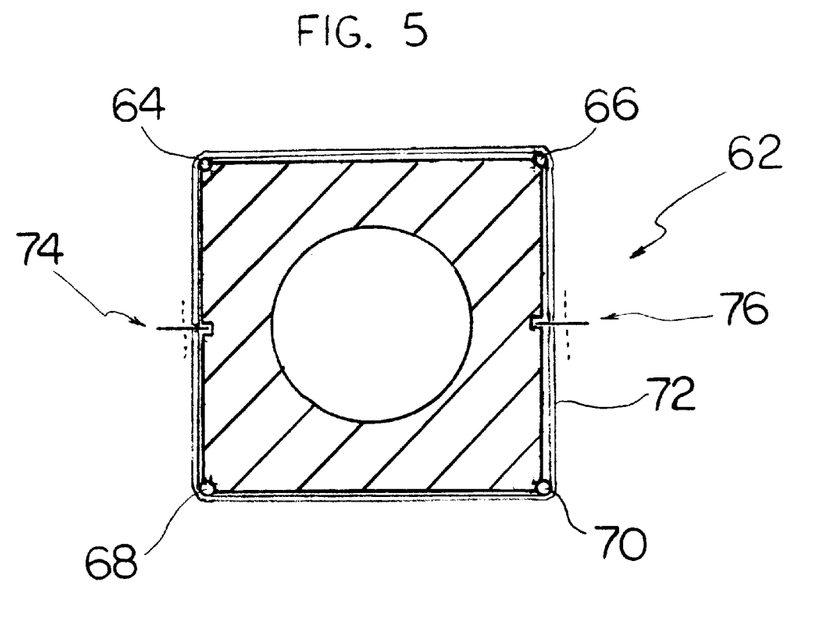
FIG. 5 is a horizontal sectional view of an apparatus for making bristle sub-assemblies according to another preferred embodiment of the present invention, taken at a cutting stage.

Other monofilament bristle sub-assemblies can be made by varying the number of base strings and re-positioning the slitters. For example, in FIG. 5 the mandrel 62 has a substantially square cross-sectional shape, with base strings 64, 66, 68 and 70 disposed respectively at each of the four corners of the mandrel 62. A monofilament 72 is wrapped around the mandrel 62 and transported by the base strings as before to form a plurality of wraps. After passing under ultrasonic bonders (not shown) and thermally fused to the base strings, the monofilament wraps are transported to a cutting station which includes two cutting blades 74 and 76.

Figure 6:
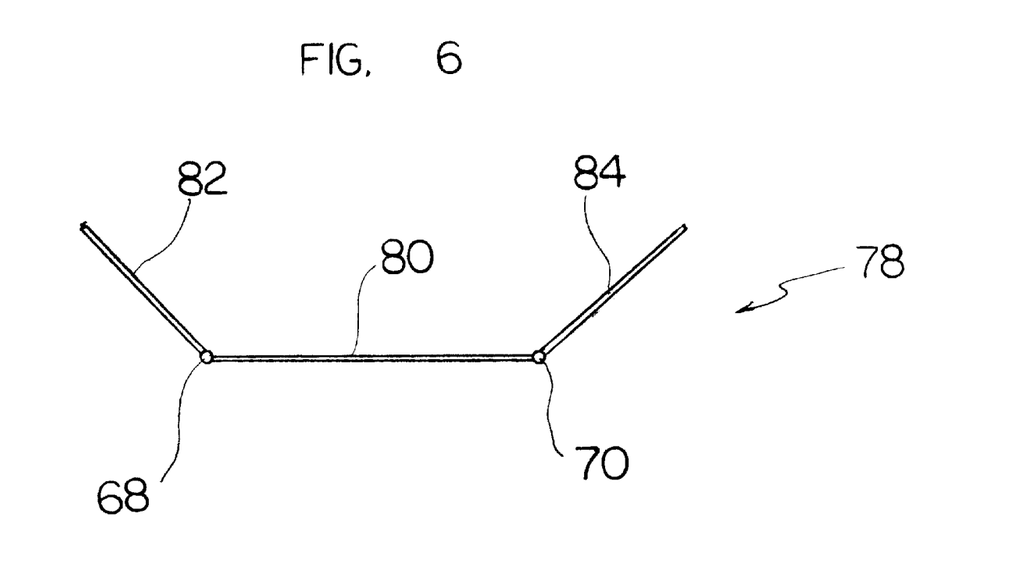
FIG. 6 is an end view of a bristle string sub-assembly made by the apparatus of FIG. 5.
Figure 7:
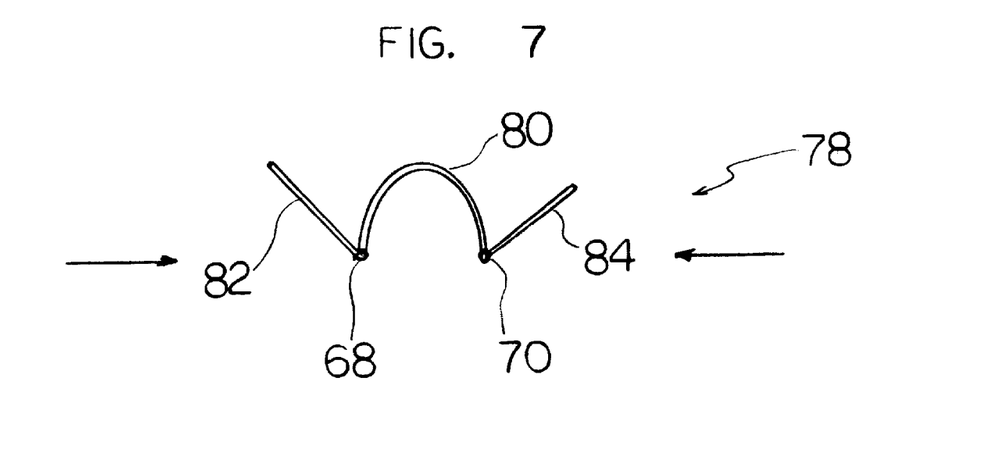
FIG. 7 is an end view of the bristle string sub-assembly of FIG. 6, bent to form an arch section.

The cutting blades cut the monofilament wraps on opposite sides of the mandrel 62 to form two nearly identical bristle string sub-assemblies 78, of which one is shown in FIG. 6. The sub-assembly 78 includes a plurality of monofilament segments 80 connecting to and extending between the two base strings 68 and 70, and two rows of monofilament segments 82 and 84. As seen in FIG. 7, when the base strings 68 and 70 are brought together in the direction of the directional arrows, the monofilament segments 80 form an arch.

Figure 8:
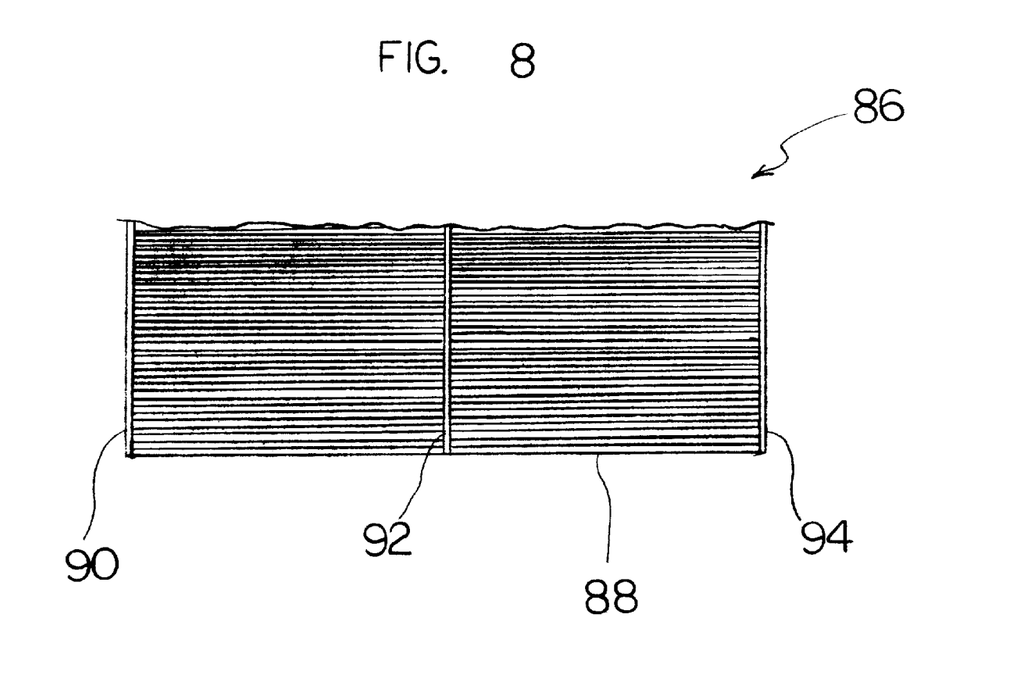
FIG. 8 is a plan view of a bristle sub-assembly made according to another embodiment of the present invention.
Figure 9:
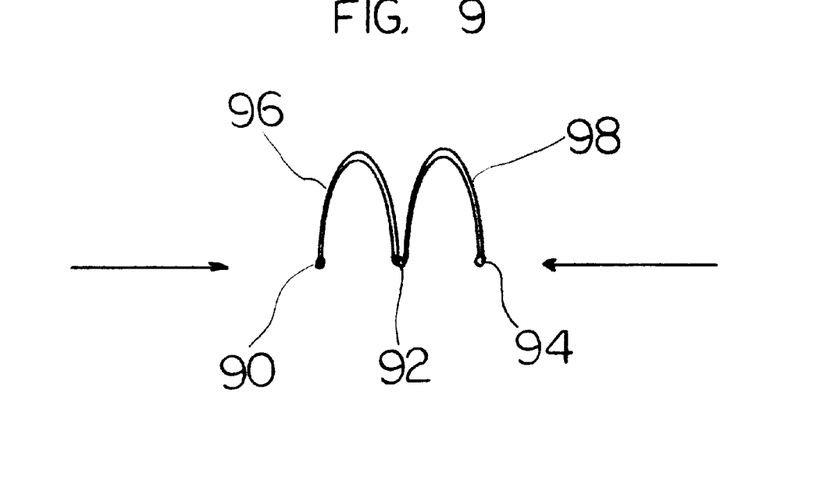
FIG. 9 is an end view of the bristle sub-assembly according to claim 8, after forming a pair of arched segments.

In another embodiment, seen in FIG. 8, the monofilament wraps are cut to form a bristle string sub-assembly 86 in which the monofilament segments 88 are connected to base strings 90, 92 and 94. As seen in FIG. 9, when the two outer base strings 90 and 94 are moved towards the middle base string 92, as illustrated by the directional arrows, a pair of arched segments 96 and 98 are formed.

Figure 10:
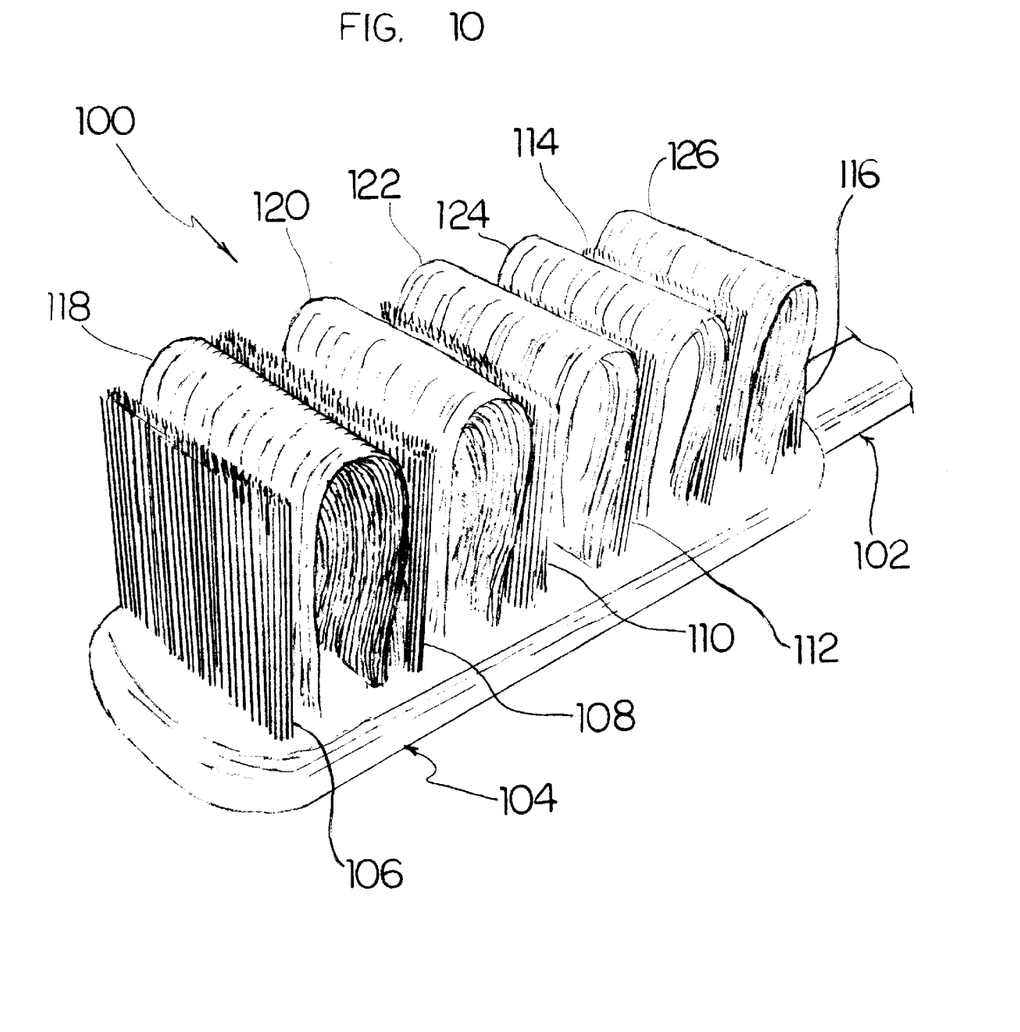
FIG. 10 is a perspective view of a toothbrush made with the arched bristles made according to the present invention.

The various bristle sub-assemblies described above can be used in a variety of products, including brushes. FIG. 10 shows a toothbrush 100 having a handle portion 102, a head portion 104, and a bristle portion which includes straight rows 106, 108, 110, 112, 114 and 116 of monofilament bristles, which are alternatingly disposed between arched rows 118, 120, 122, 124 and 126 of monofilament bristles. The straight bristles can be made according to the techniques described in co-pending application Serial No. 09/092,092 entitled Method and Apparatus For Making Articles Having Bristles, now U.S. Pat. No. 6,096,151, which is incorporated herein by reference. Alternatively, the straight bristles can be made by using the techniques described herein with respect to the embodiment of FIG. 7, whereby the straight bristles are made from the straight segments 82 and 84.

Figure 11:
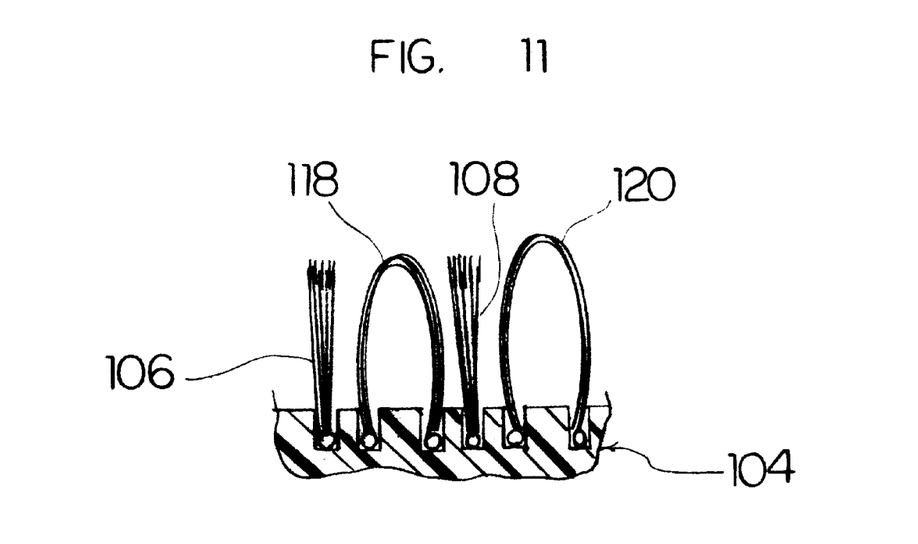
FIG. 11 is a partial, longitudinal cross-sectional view of the forward portion of the toothbrush of FIG. 10.

The straight bristles and arched bristle sub-assemblies are assembled with the head portion 104 by using the techniques described in co-pending application Ser. No. 09/092,094, pending, entitled Monofilament Bristle Assemblies and Methods of Making Brushes Using Same, which is incorporated herein by reference. For example, and as seen in FIG. 11, the head portion 104 is provided with transverse grooves which receive the single base strings of straight rows 106 and 108 and the two base strings of arched rows 118 and 120. Alternatively, straight rows 106 and 108 can share respective grooves with the corresponding base strings of arched row 118 to form a more compact brush head. Upon placing the base strings in the grooves, chemical, thermal or mechanical means are used to seal the grooves and lock the base strings in place.

Figure 12:
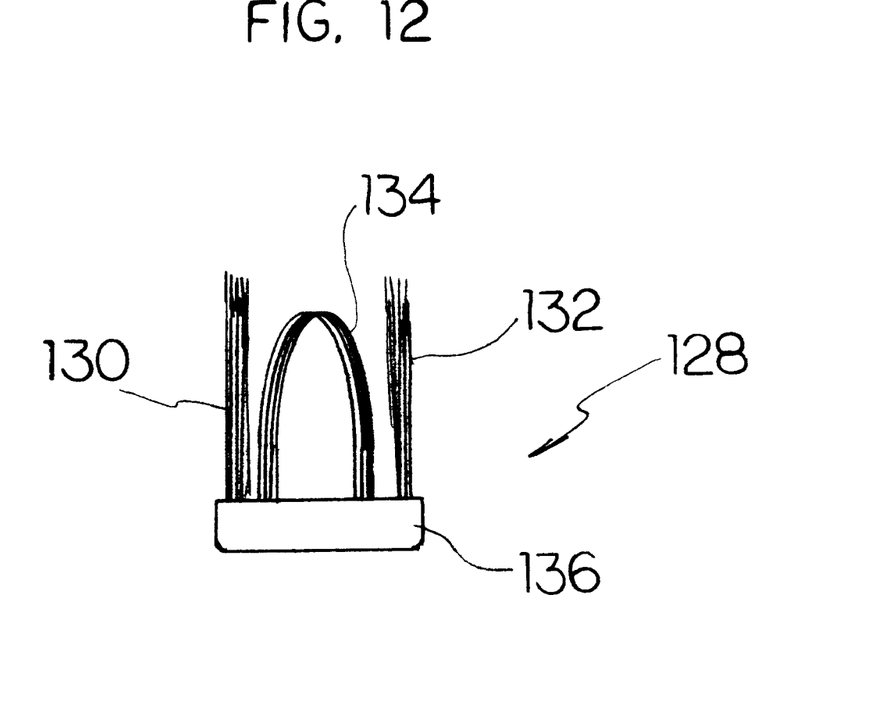
FIG. 12 is an end view of a brush head according to another embodiment of the present invention, and having a row of arched bristles and two flanking rows of straight bristles.

The bristle sub-assemblies described herein can be used to construct brushes with a variety of bristle patterns and combinations. FIG. 12, which is a front end view of a toothbrush 128, has two rows 130 and 132 of straight monofilament bristles which flank a single row 134 of arched monofilament bristles. The rows 130 and 132 extend to a height greater than the apex of the row 134 of arched monofilaments. All three rows extend longitudinally from the upper surface of a head portion 136 of the toothbrush 128. Each of rows 130 and 132 have a base string mounted in the head portion 136, while row 134 has two base strings mounted in the head portion, one corresponding to each leg of the arched monofilaments.

Figure 13:
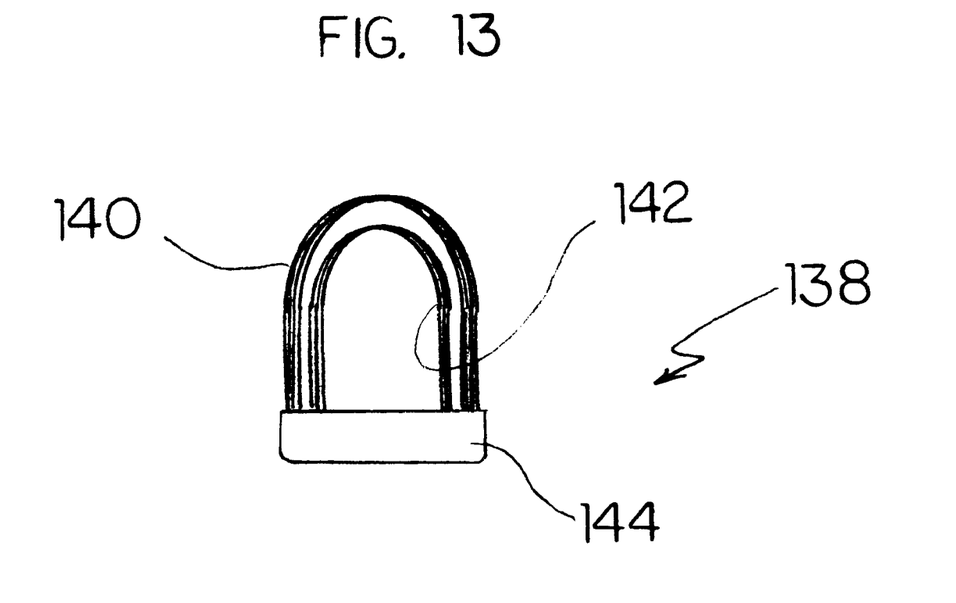
FIG. 13 is an end view of a brush head according to another embodiment of the present invention, and having a first row of arched bristles concentrically disposed with a second row of arched bristles.

FIG. 13, also a front end view of a toothbrush 138, has two rows 140 and 142 of arched monofilament bristles which are disposed concentrically with respect to each other. Row 140 has an apex greater than that of row 142, and the legs of row 140 are disposed outside the legs of row 142. Both rows extend longitudinally from the upper surface of a head portion 144 of the toothbrush 138. Each of rows 140 and 142 have two base strings mounted in the head portion 144.

Figure 14:
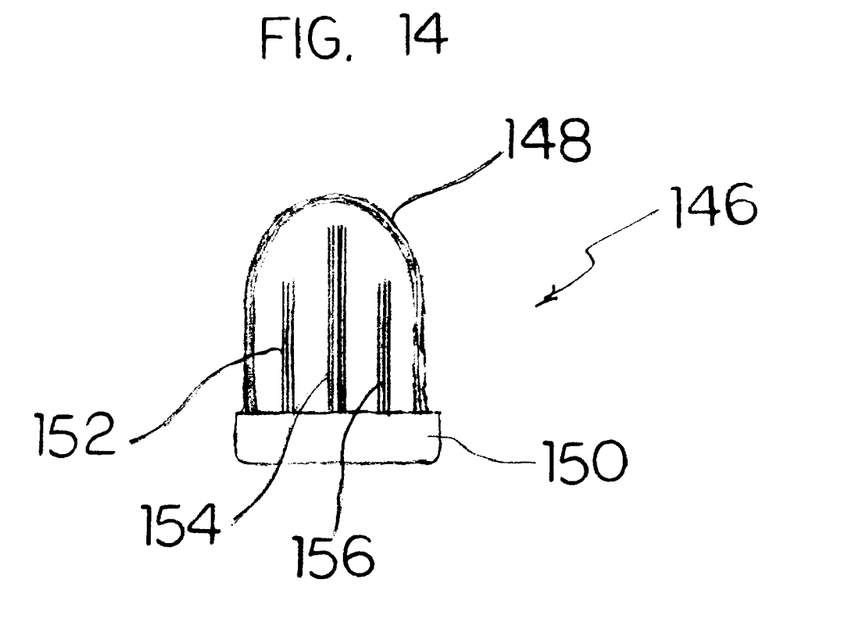
FIG. 14 is an end view of a brush head according to another embodiment of the present invention, and having a row of arched bristles extending over three longitudinal rows of straight bristles.

FIG. 14, also a front end view of a toothbrush 146, has a row 148 of arched monofilament bristles which run longitudinally along the brush head 150, and three rows 152, 154, and 156 of straight bristles which likewise run longitudinally along the brush head.

The various embodiments described herein can employ virtually any combination of arched and straight bristle sub-assemblies, and may further include the looped bristle sub-assemblies described in U.S. Ser. No. 09/092,092, now U.S. Pat. No. 6,096,151.

An advantage to the present invention is that the bristle sub-assemblies can be mixed and matched to create a variety of desired arched and straight bristle combinations. For toothbrush applications, the arched bristles have the additional advantage that there are no distal ends to be treated, as is the case for straight bristles.

The monofilaments used for both the straight and arched bristle sub-assemblies are each a single filament, as opposed to a "multi-filament," such as yarn, twine, etc., although the monofilament may be a co-extrusion of one or more polymers to form a coaxial structure. The monofilaments may be made of several different materials, including aliphatic polyamides, aromatic polyamides, polyesters, polyolefins, polystyrene, polyvinylchloride (PVC), polyurethane, polyvinylidene chloride, fluoropolymers, styrenes and styrene copolymers. A particularly suitable polymeric material for toothbrush applications is 6,12 nylon; other nylons may be used, including 4 nylon, 6 nylon, 11 nylon, 12 nylon, 6,6 nylon, 6,10 nylon, 6,14 nylon, 10,10 nylon and 12,12 nylon and other nylon co-polymers. An example of a preferred polyester is polybutylene terephthalate (PBT).

When the monofilaments are abutting as in FIG. 3, the interconnection of adjacent monofilaments to each other in a flow zone may be relatively strong compared to the interconnection of the base strings to the flow zone which is substantially composed of monofilament material. This feature allows, in some applications, the removal of the base strings from the monofilaments anytime after thermal fusing. Alternatively, the adhesion between the monofilaments and the base string can be at least as strong as the adhesion between monofilaments.

While FIG. 3 shows the monofilaments in a single row, shoulder-to-shoulder, the density can be varied such that the adjacent monofilaments do not touch each other. Also, the density may be such that a second or greater number of rows of monofilaments are stacked upon each other. Where eight (8) mil nylon monofilament is used, for example, a density of about 125 monofilaments per inch of base string can be achieved with a single row, shoulder-to-shoulder monofilaments.

While toothbrush embodiments have been described, any of the wide variety of known brushes could be constructed using the arched bristles, arch-and-loop bristle combinations or arch-and-straight bristle combinations according to the present invention. For some brush applications, the monofilaments may include abrasive particles or grit material for particular brush applications. Abrasive monofilaments are commercially available under the name TYNEX® A by E.I. Du Pont De Nemours and Company of Wilmington, Del. USA. Preferably, the abrasive material comprises 0–50% by weight of the polymeric monofilaments. TYNEX® A is a 6,12 nylon monofilament containing particles of silicon carbide or aluminum oxide, which are distributed throughout the monofilament.

When ultrasonic welding is used, at least the monofilament or the base string, preferably both, are made of thermoplastic polymeric materials. These have been described above in reference to other embodiments.

The monofilaments used in any of the above embodiments may be co-extrusions of one or more polymers. Also, to achieve the desired physical characteristics of the bristles used for applications such as cleaning and scrubbing brushes, it has been found that the preferred monofilaments are those having a diameter between 2 and 200 mils, and preferably between 2 and 20 mils. In a particularly preferred embodiment for the toothbrush, the monofilaments are 4–10 mils in diameter. Monofilaments of different diameters, cross-sections, materials, surface properties and/or colors can be combined in one bristle assembly or sub-assembly to achieve specific brushing characteristics and/or appearance.

In embodiments using nylon for either the monofilament or the base string, or both, a preferred nylon is sold under the name TYNEX®, and is manufactured by E.I. Du Pont De Nemours and Company of Wilmington, Del. USA. TYNEX® is polyhexamethylene dodecanamide, which is the technical name for 6,12 nylon. It has a melting point of between 208 and 215° C. and has a specific gravity of 1.05–1.07, and is available commercially in many shapes and diameters.

Monofilaments and/or base strings suitable for use in the present invention can have shapes other than circular cross-sections, and may be hollow or have voids in their cross-section. Embodiments described above show circular cross-sectional shapes for the base string and monofilaments. Either or both the base string and monofilaments could have oval, rectangular, or other shapes. In any shape, the preferred thicknesses for the base string and monofilaments are selected to provide a level of functionality to the individual brush applications.

With respect to the base string, the preferred embodiments described above show a single strand of monofilament material. However, the base string could be a bundle of monofilaments having at least one of the monofilaments made of polymeric thermoplastic material.

The polymeric monofilaments used for bristles in the various embodiments described above can have other additives. For example, the polymeric monofilaments could include 0–50% by weight particles having finctional and/or aesthetic quality. One example would be particulate material that provides a color feature that would enhance the visual appearance of the bristles. Other functional particles could also be included such as anti-microbial additives in the polymeric monofilaments. Other particulate materials or coatings may be applied to or embodied within the monofilament such as therapeutic agents or colorants, or other desirable additives. Also, the monofilaments may be surface treated to provide desired properties, such as to alter frictional coefficient.

The embodiments described above require "connection" between the monofilaments and the base string. In this context, "connection" means that the monofilaments are attached to the base string by a frangible joint formed by melting, adhesive bonding, solvent bonding, or similar means. The degree of frangibility can be controlled so that, if desired, the base string can be easily separated from the monofilaments after bonding.

The arched bristles described herein can be put on any brush head in any configuration or pattern. For example, the arched bristles may run parallel to or transverse the longitudinal axis of the brush head, or transverse and longitudinal bristles can be used concurrently. The head itself can have a substantially flat surface from which the bristles extend upwardly, as shown in the illustrated embodiments. Alternatively, the brush head can have a shaped, i.e., curved surface, in which case the bristles would tend to fan outwardly, for the case of a convex surface, or fan inwardly for the case of a concave surface. Also, the two base strings of an arched bristle sub-assembly can be mounted in the brush head in a non-parallel fashion, such that the arched row of bristles adopt a desired profile in which the apex of the arch changes along the length of the row.

Although the invention has been described with reference to several particular embodiments, it will be understood to those skilled in the art that the invention is capable of a variety of alternative embodiments within the spirit and scope of the appended claims.

What is claimed is:

1. A bristle sub-assembly comprising:
   (a) first and second base strings,
   (b) a plurality of monofilaments extending between the first and second base strings, and
   (c) a flow zone forming frangible joints connecting the monofilaments to the first and second base strings, whereby the monofilaments form a first arched row between the first and second base strings.

2. A bristle sub-assembly according to claim 1, wherein at least one of the base strings and the monofilaments are made of a polymeric material.

3. A bristle sub-assembly according to claim 2, wherein the polymeric material is a thermoplastic polymeric material.

4. A bristle sub-assembly according to claim 1, wherein at least one of the base strings and the monofilaments are made of a material selected from the group consisting of aliphatic polyamides, aromatic polyamides, polyesters, polyolefins, styrenes, polyvinylchloride (PVC), fluoropolymers, polyurethane, polyvinylidene chloride, polystyrene and styrene copolymers, and co-extrusions of at least one polymer.

5. A bristle sub-assembly according to claim 1, wherein at least one of the base strings and the monofilaments are made of a nylon material.

6. A bristle sub-assembly according to claim 5, wherein the nylon material is selected from the group consisting of 4 nylon, 6 nylon, 11 nylon, 12 nylon, 6,6 nylon, 6,10 nylon, 6,12 nylon, 6,14 nylon, 10,10 nylon and 12,12 nylon and other nylon copolymers.

7. A bristle sub-assembly according to claim 1, wherein at least one of the base strings and the monofilaments are made of polybutylene terephthalate (PBT).

8. A bristle sub-assembly according to claim 1, wherein at least one of the base strings is a monofilament made of thermoplastic material having a diameter of 2–200 mils.

9. A bristle sub-assembly according to claim 1, wherein the base string is a bundle of monofilaments, at least one of which is made of a thermoplastic polymeric material.

10. A bristle sub-assembly according to claim 1, wherein the monofilaments are heat fused to the base strings.

11. A bristle sub-assembly according to claim 1, wherein the monofilaments are solvent bonded to the base strings.

12. A bristle sub-assembly according to claim 1, wherein the monofilaments have a diameter between 2 and 200 mils.

13. A bristle sub-assembly according to claim 1, wherein the monofilaments have varying diameters between 2 and 200 mils.

14. A bristle sub-assembly according to claim 1, wherein at least one of the base strings and the monofilaments have substantially circular cross-sectional shape.

15. A bristle sub-assembly according to claim 1, wherein at least one of the base strings and the monofilaments have substantially non-circular cross-sectional shape.

16. A bristle sub-assembly according to claim 1, further comprising a third base string disposed between the first and second base strings and connected to the monofilaments, whereby the monofilaments form the first arched row between the first and third base strings, and form a second arched row between the second and third base strings.

17. A bristle sub-assembly according to claim 1, wherein at least one of the base strings is a monofilament made of thermoplastic material having a diameter of 2–200 mils.

18. A bristle sub-assembly according to claim 1, wherein the base string is a bundle of monofilaments at least one of which is made of a thermoplastic polymeric material.

19. A brush assembly comprising:

(a) a brush body having a head; and (b) a first bristle sub-assembly connected to the head of the brush body, wherein the first bristle sub-assembly comprises (i) first and second base strings, (ii) a plurality of monofilaments extending between the first and second base strings, and (iii) a flow zone forming frangible joints connecting the monofilaments to the first and second base strings; and wherein the monofilaments form a first arched row that extends upwardly from the brush body.

20. A brush assembly according to claim 19, wherein at least one of the base strings and the monofilaments are made of polymeric material.

21. A brush assembly according to claim 19, wherein at least one of the base strings and the monofilaments are made of thermoplastic material.

22. A brush assembly according to claim 19, wherein the first and second base strings are each at least a single monofilament made of a polymeric thermoplastic material.

23. A brush assembly according to claim 19, wherein at least one of the base strings and the monofilaments are made of a material selected from the group consisting of aliphatic polyamides, aromatic polyamides, polyester, polyolefins, styrenes, polyvinylchloride (PVC), fluoropolymers, polyurethane, polyvinylidene chloride, polystyrene, and styrene copolymers and co-extrusions of at least one polymer.

24. A brush assembly according to claim 19, wherein at least one of the base strings and the monofilaments are made of a nylon material.

25. A brush assembly according to claim 24, wherein the nylon material is selected from the group consisting of 4 nylon, 6 nylon, 11 nylon, 12 nylon, 6,6 nylon, 6,10 nylon, 6,12 nylon, 6,14 nylon, 10,10 nylon and 12,12 nylon and other nylon co-polymers.

26. A brush assembly according to claim 19, wherein at least one of the base strings and the monofilaments are made of polybutylene teraphthalate (PBT).

27. A brush assembly according to claim 19, wherein the monofilaments are heat fused to the first and second base strings.

28. A brush assembly according to claim 19, wherein the monofilaments are solvent bonded to the first and second base strings.

29. A brush assembly according to claim 19, wherein the monofilaments have a diameter between 2 and 200 mils.

30. A brush assembly according to claim 19, wherein the monofilaments have diameters that vary between 2 and 200 mils.

31. A brush assembly according to claim 19, further comprising at least a second bristle sub-assembly connected to the head of the brush body, wherein the second bristle sub-assembly comprises (a) at least third and fourth base strings; and (b) a plurality of polymeric monofilaments that are connected to and extend between the third and fourth base strings, and form a second arched row that extends upwardly from the brush body.

32. A brush assembly according to claim 31, wherein the first and second arched rows are mounted longitudinally and concentrically on the brush body.

33. A brush assembly according to claim 31, wherein the first and second arched rows are mounted transversely on the brush body.

34. A brush assembly according to claim 18, further comprising at least one row of straight monofilament bristles, assembled with the head of the brush body, each row including a plurality of monofilament bristles extending upwardly from a base string.

35. A bristle sub-assembly comprising:

(a) first and second base strings, (b) a plurality of monofilaments extending between the first and second base strings, and (c) adhesive forming frangible joints connecting the monofilaments to the first and second base strings, whereby the monofilaments form a first arched row between the first and second base strings.

36. A bristle sub-assembly according to claim 35, wherein at least one of the base strings and the monofilaments are made of a polymeric material.

37. A bristle sub-assembly according to claim 36, wherein the polymeric material is a thermoplastic polymeric material.

38. A bristle sub-assembly according to claim 35, wherein at least one of the base strings and the monofilaments are made of a material selected from the group consisting of aliphatic polyamides, aromatic polyamides, polyesters, polyolefins, styrenes, polyvinylchloride (PVC), fluoropolymers, polyurethane, polyvinylidene chloride, polystyrene and styrene copolymers, and co-extrusions of at least one polymer.

39. A bristle sub-assembly according to claim 35, wherein at least one of the base strings and the monofilaments are made of a nylon material.

40. A bristle sub-assembly according to claim 39, wherein the nylon material is selected from the group consisting of 4 nylon, 6 nylon, 11 nylon, 12 nylon, 6,6 nylon, 6,10 nylon, 6,12 nylon, 6,14 nylon, 10,10 nylon and 12,12 nylon and other nylon copolymers.

41. A bristle sub-assembly according to claim 35, wherein at least one of the base strings and the monofilaments are made of polybutylene terephthalate (PBT).

42. A bristle sub-assembly according to claim 35, wherein the monofilaments have a diameter between 2 and 200 mils.

43. A bristle sub-assembly according to claim 35, wherein the monofilaments have varying diameters between 2 and 200 mils.

44. A bristle sub-assembly according to claim 35, wherein at least one of the base strings and the monofilaments have substantially circular cross-sectional shape.

45. A bristle sub-assembly according to claim 35, wherein at least one of the base strings and the monofilaments have substantially non-circular cross-sectional shape.

46. A bristle sub-assembly according to claim 35, further comprising a third base string disposed between the first and second base strings and connected to the monofilaments, whereby the monofilaments form the first arched row between the first and third base strings, and form a second arched row between the second and third base strings.

47. A brush assembly comprising:
(a) a brush body having a head; and
(b) a first bristle sub-assembly connected to the head of the brush body, wherein the first bristle sub-assembly comprises (i) first and second base strings, (ii) a plurality of monofilaments extending between the first and second base strings, and (iii) adhesive forming frangible joints connecting the monofilaments to the first and second base strings; and wherein the monofilaments form a first arched row that extends upwardly from the brush body.

48. A brush assembly according to claim 47, wherein at least one of the base strings and the monofilaments are made of polymeric material.

49. A brush assembly according to claim 47, wherein at least one of the base strings and the monofilaments are made of thermoplastic material.

50. A brush assembly according to claim 47, wherein the first and second base strings are each at least a single monofilament made of a polymeric thermoplastic material.

51. A brush assembly according to claim 47, wherein at least one of the base strings and the monofilaments are made of a material selected from the group consisting of aliphatic polyamides, aromatic polyamides, polyester, polyolefins, styrenes, polyvinylchloride (PVC), fluoropolymers, polyurethane, polyvinylidene chloride, polystyrene, and styrene copolymers and co-extrusions of at least one polymer.

52. A brush assembly according to claim 47, wherein at least one of the base strings and the monofilaments are made of a nylon material.

53. A brush assembly according to claim 52, wherein the nylon material is selected from the group consisting of 4 nylon, 6 nylon, 11 nylon, 12 nylon, 6,6 nylon, 6,10 nylon, 6,12 nylon, 6,14 nylon, 10,10 nylon and 12,12 nylon and other nylon copolymers.

54. A brush assembly according to claim 47, wherein at least one of the base strings and the monofilaments are made of polybutylene teraphthalate (PBT).

55. A brush assembly according to claim 47, wherein the monofilaments have a diameter between 2 and 200 mils.

56. A brush assembly according to claim 47, wherein the monofilaments have diameters that vary between 2 and 200 mils.

57. A brush assembly according to claim 47, further comprising at least a second bristle sub-assembly connected to the head of the brush body, wherein the second bristle sub-assembly comprises
(a) at least third and fourth base strings; and
(b) a plurality of polymeric monofilaments that are connected to and extend between the third and fourth base strings, and form a second arched row that extends upwardly from the brush body.

58. A brush assembly according to claim 57, wherein the first and second arched rows are mounted longitudinally and concentrically on the brush body.

59. A brush assembly according to claim 57, wherein the first and second arched rows are mounted transversely on the brush body.

60. A brush assembly according to claim 47, further comprising at least one row of straight monofilament bristles, assembled with the head of the brush body, each row including a plurality of monofilament bristles extending upwardly from a base string.

* * * * *